(12) United States Patent
Noar et al.

(10) Patent No.: US 12,251,030 B2
(45) Date of Patent: Mar. 18, 2025

(54) AIR FILTERING COVER ENGAGEABLE WITH INFANT CARRIER

(71) Applicants: Nicole Noar, Solana Beach, CA (US); Kevin Noar, Solana Beach, CA (US)

(72) Inventors: Nicole Noar, Solana Beach, CA (US); Kevin Noar, Solana Beach, CA (US)

( * ) Notice: Subject to any disclaimer, the term of this patent is extended or adjusted under 35 U.S.C. 154(b) by 325 days.

(21) Appl. No.: 17/694,584

(22) Filed: Mar. 14, 2022

(65) Prior Publication Data

US 2022/0204068 A1 Jun. 30, 2022

Related U.S. Application Data

(63) Continuation-in-part of application No. 16/537,317, filed on Aug. 9, 2019, now abandoned.

(51) Int. Cl.
| | |
|---|---|
| *A47D 13/02* | (2006.01) |
| *A47D 15/00* | (2006.01) |
| *B01D 46/00* | (2022.01) |
| *B01D 46/10* | (2006.01) |
| *B62B 9/14* | (2006.01) |

(52) U.S. Cl.
CPC ......... *A47D 13/025* (2013.01); *A47D 13/027* (2022.08); *A47D 15/00* (2013.01); *B01D 46/0015* (2013.01); *B01D 46/10* (2013.01); *B62B 9/142* (2013.01)

(58) Field of Classification Search
None
See application file for complete search history.

(56) References Cited

U.S. PATENT DOCUMENTS

| | | | | |
|---|---|---|---|---|
| 5,730,490 | A | * 3/1998 | Mortenson | B60N 2/28 297/184.13 |
| 2012/0256452 | A1 | * 10/2012 | Berry | A47D 13/02 297/184.13 |
| 2016/0327491 | A1 | * 11/2016 | Wood | F24F 13/28 |

FOREIGN PATENT DOCUMENTS

| | | | | |
|---|---|---|---|---|
| KR | 200428508 Y1 | * 10/2006 | | B62B 9/142 |
| KR | 20080004176 U | * 9/2008 | | B62B 9/12 |
| KR | 20130005867 U | * 10/2013 | | B01D 39/16 |

OTHER PUBLICATIONS

KR20130005867U_ENG (Espacenet translation of Kim) (Year: 2013).*
KR20080004176U_ENG (Espacenet translation of Kim) (Year: 2008).*
KR200428508Y1_ENG (Espacenet translation of Hwang) (Year: 2006).*

* cited by examiner

*Primary Examiner* — Gabriel E Gitman
(74) *Attorney, Agent, or Firm* — Donn K. Harms

(57) ABSTRACT

An air filtering cover is configured to engage over an infant carrier to filter air communicated into an interior cavity thereof. A cover body has a top wall having a pocket with two sidewalls and a filter element and form a flowpath for air communicating through the body and filter to remove dirt, dust, and pathogens from air reaching the occupant of the interior cavity. The filter may be replaceable within a pocket formed in the cover body. A gauge strip may be positioned on the filter which changes in appearance when the filter needs replacement.

16 Claims, 9 Drawing Sheets

AIR FILTERING COVER ENGAGEABLE WITH INFANT CARRIER

FIELD OF THE INVENTION

This application claims priority to U.S. patent application Ser. No. 16/537,317 filed on Aug. 9, 2019, which is incorporated herein in its entirety by this reference thereto.

The present invention relates to infant carriers widely employed for carrying and protection of infants and young children. More particularly, it relates to an air filtering cover adapted for engagement with conventional rigid infant carriers which filters the air communicated to the infant in the carrier to filter air pollution and inhibit the passage of pathogens through the cover.

BACKGROUND OF THE INVENTION

In a majority of industrialized countries, infants and small children are transported in substantially rigid infant carriers. Such infant carriers have become common for holding infants and small children while riding in vehicles. Further, it has become a common occurrence for parents and care givers of infants and small children, to carry them to various destinations while they are secured within the infant carrier. Additionally, many parents and care givers of infants and small children use the infant carriers as chairs or holders for infants and small children, such as in restaurants, grocery stores and the like.

While being transported within a cavity in these carriers, the infants and toddlers occupying them are exposed to the world and the atmosphere surrounding them. During such transport they breathe and make contact with the air in the local area where they are visiting or being transported. Unfortunately, the air in many locales and buildings, which the carrier-held infants and small children are exposed to, frequently may have pollutants as well as germs and pathogens to which the infant is also exposed during travel to and through various venues. As such, parents and care givers may expose their infants and children, who they assume are protected within the carrier, to unseen hazards from air pollution and airborne pathogens.

The device herein disclosed is adapted for biased engagement with such infant carriers to form a cover over the internal cavity of the infant carrier occupied by the infant or small child. So engaged, the device features a flexible wall having a filtration element therein. The replaceable filtration element is adapted to prevent communication of air pollutants and particulate as well as many pathogens through the cover, thereby protecting the housed infant or child in the carrier from exposure to such.

The forgoing examples of infant and child carriers and the limitations related therewith are intended to be illustrative and not exclusive. The disclosed examples and background do not imply any limitations on the invention described and claimed herein. Various other limitations of the related art of protective infant carriers are known, or such will become apparent to those skilled in the art upon a reading and understanding of the specification below and the accompanying drawings.

SUMMARY OF THE INVENTION

The device and system herein disclosed and described provides a solution to the shortcomings in prior art of child carrier covers employed to cover an occupant of infant carriers used to carry small children.

In all modes of the cover device herein, it has a fabric body which is preferably configured about substantially all of a perimeter edge sidewall to stretch and form a biased contact, which engages and forms a seal around the exterior surface of a conventional hard sided child carrier. An opening, sized to stretch and slide over the exterior of the child carrier in addition, is surrounded by elastic material which will provide a biased engagement to a lower edge of the child carrier in addition to the elastic woven or knitted fabric material which upon cessation of stretching will contract and form a biased contact on and around the child carrier and form a contoured contact against the different surface areas thereof. By elastic material herein is meant that the woven or knitted fabric forming the body is formed of or includes elastic yarn or fibers such as LYCRA, SPANDEX, or Elastane, which will stretch and subsequently retract. This allows the user to slide the body of the device over a conventional hard sided child carrier through an opening positioned on a bottom of the body, and then allow the elastic fabric to contract. This contraction causes the sidewall of the body of the device to contract and form a biased contact against the sides of the child carrier, even into any recesses and contours of that surface, thereby forming a circumferential seal around the sides of the child carrier.

The device has a body with a pocket positioned in a front wall at a top frontal area. This interior pocket is formed with two sidewalls and has an interior which is accessible through a pocket opening formed in one of the two sidewalls. An air filter, such as a polymeric filter element formed from polymeric expanded foam or non woven polymeric filaments or similar filtration material, is configured in a size substantially equal to the dimensions of the formed pocket in the body, or preferably, at least in a size which will wrap around a contact line with the perimeter edge of the interior area of the child carrier.

This polymeric filter is replaceable over time to renew the filtering and anti-pathogenic qualities thereof. The polymeric material forming the filter element may be impregnated with one or a plurality of anti-pathogenic materials such as carbon, silver or silver ions, nickel or nickel ions, aluminum ions and other materials. Further, the filter element is preferably at least formed to have passages between 1.5 and 4.5 microns, such that air passing through the filter element must travel through these passages where upon particulate and pathogens are removed.

In all modes of the device herein, it is preferable that easy access to the carrying handle for the child carrier be provided and maintained with the cover device engaged. In configuring the cover device to engage with or over the carrying handle, it is preferable that it also include a means to allow the user to view the occupant which also provides a means to easily grasp a handle on the carrier. This easy access to the carrying handle is especially preferred, where the sidewall fabric is opaque or decorative woven fabric. While such fabric blocks the view of the handle and into the carrier, it also provides the occupant shade. It is preferred, with such occupant-viewing or handle openings, that a filtering cover flap be positioned thereover, to prevent unfiltered air passage through the cover device.

The cover device can be configured to form biased contact of the sidewalls against the surface of the child carrier and then to drape over the top of the conventional handle of such infant carriers. In a particularly preferred mode, it may include one or a plurality of connecting straps which will hold the body of the device elevated above the infant but underneath the exposed handle. Alternatively and especially preferred for the positioning of the handle for carrying, the body of the cover can have a rear flap which connects to a front portion, such that a biased contact with the handle is formed. Such is preferred to allow for easy grasping of the handle to carry and transport the infant holder and occupant thereof, but still provide privacy and/or shade and a calming blocked view to the infant or child occupant such as for napping.

With respect to the above description, before explaining at least one preferred embodiment of the gate or barrier disclosed and described herein in detail, it is to be understood that the invention is not limited in its application to the details of construction and to the arrangement of the components in the following description or illustrated in the drawings. The barrier or gate invention herein described and shown is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other air filtering devices adapted for infant carrier engagement, and for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Further, where employed the term "substantially" unless otherwise specifically defined, is meant plus or minus five percent.

It is an object of this invention to provide a fabric cover for a child carrier having an air filtering device adapted for removable engagement to a plurality of such infant carriers.

It is an additional object of this invention to provide such a air filtering device wherein an elastic sidewall of the body thereof, forms a circumferential biased contact against the sides of the child carrier which depends into the contours of that side surface.

It is another object of the present invention to provide such a removably engageable air filtering device, which is configured with a replaceable filtration media so as to allow for replacement thereof as needed.

These and other objects, features, and advantages of the disclosed infant carrier engageable air filtration device herein, as well as the advantages thereof over existing prior art, which will become apparent from the description to follow, are accomplished by the improvements described in this specification and hereinafter described in the following detailed description, which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the infant carrier engageable air filtration device herein. It is intended that the embodiments and figures disclosed herein are to be considered illustrative of the invention herein, rather than limiting in any fashion.

DETAILED DESCRIPTION OF THE INVENTION

Figure 1:
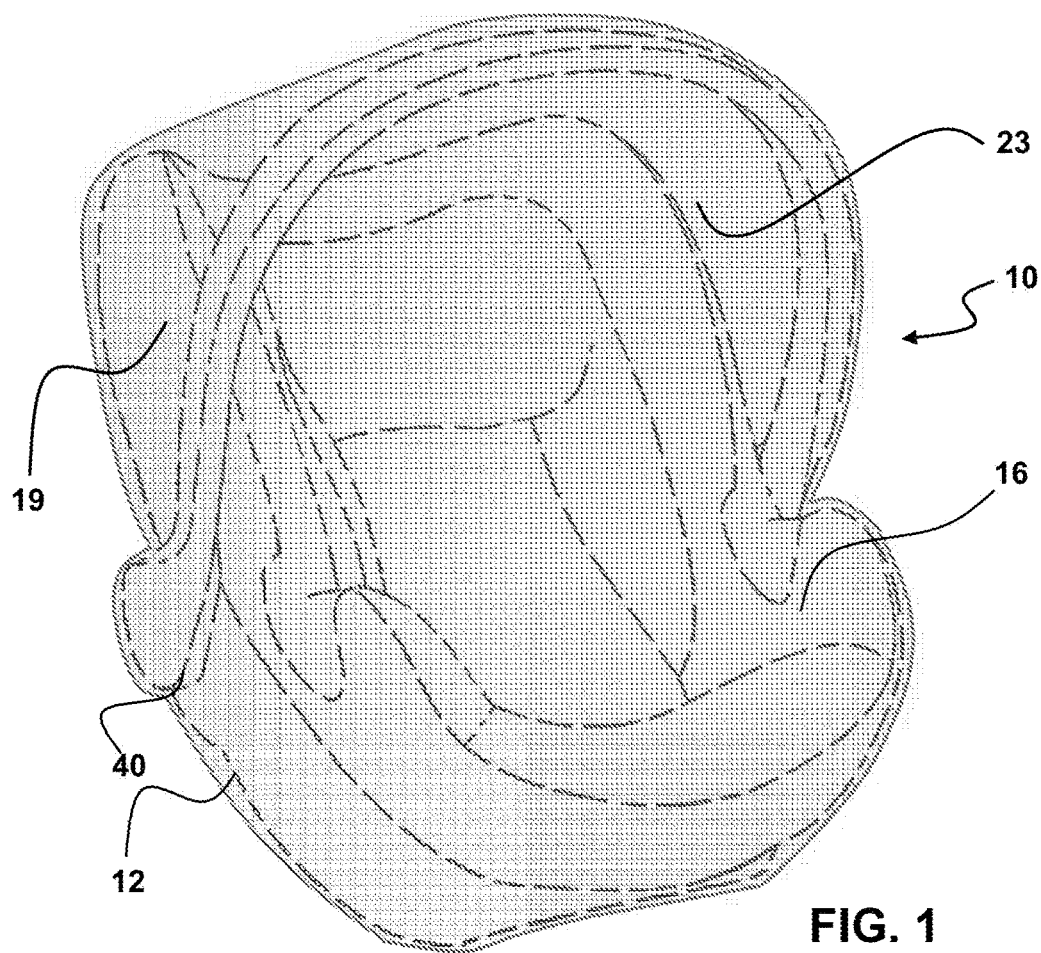
FIG. 1 is a depiction of the filtering cover device herein removably engaged over a conventional infant carrier.

In this description, the directional prepositions of up, upwardly, down, downwardly, front, back, top, upper, bottom, lower, left, right and other such terms of direction or position, refer to the device as it is oriented and appears in the drawings and are used for convenience only, and such are not intended to be limiting or to imply that the device has to be used or positioned in any particular orientation.

Figure 2:
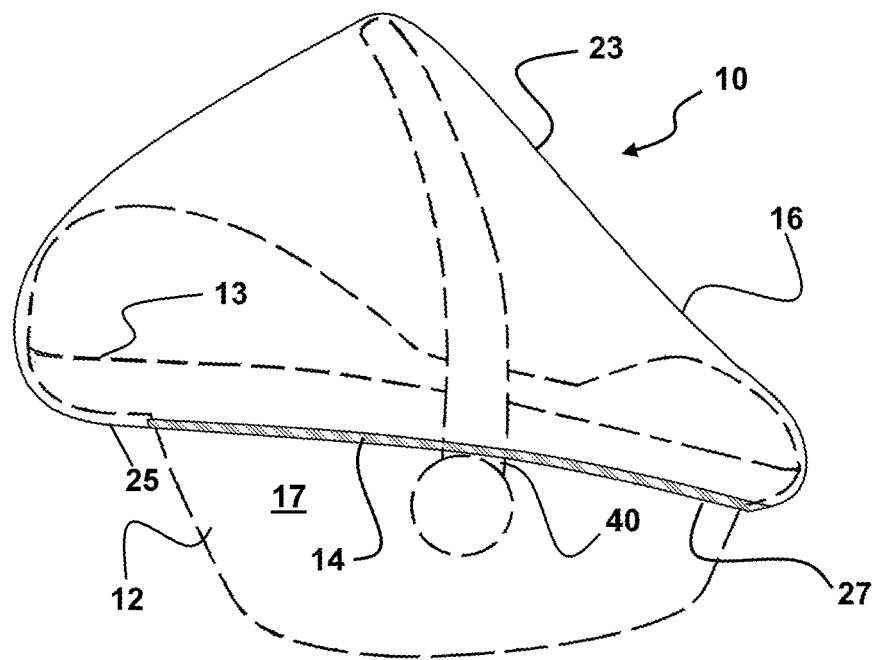
FIG. 2 is a side view of the device engaged over the infant carrier, as shown in FIG. 1, showing the wrap around engagement extending to a perimeter edge and a contact line where the cover first contacts the exterior of the carrier.
Figure 3:
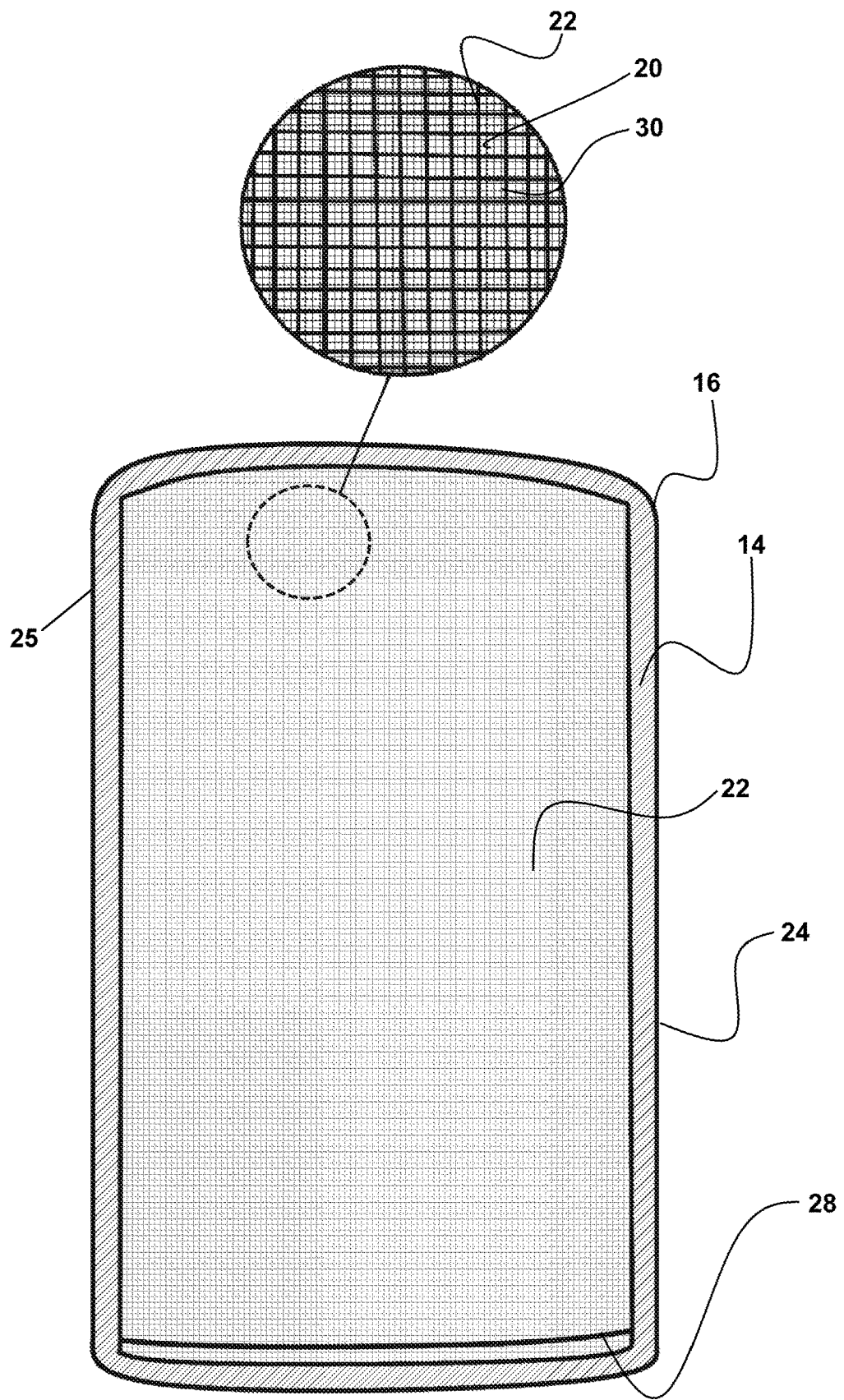
FIG. 3 shows the device of FIG. 1-2 depicting the air filter component being removably engaged within a pocket formed in the body of the cover which has elastic at the perimeter edge.

Now referring to drawings in FIGS. 1-15, wherein similar components are identified by like reference numerals, there can be seen in FIGS. 1-2 the cover device 10, which is adapted to engage with an infant carrier 12, in an engaged position upon such a conventional infant carrier 12. In the depicted engaged position of the cover device 10 with a conventional carrier 12, shown in FIGS. 1-2 and 7-10, elastic 14 is engaged at or adjacent to the perimeter edge 25 of the opening 27 of the body 16 of the device 10. In the mode of the device 10 of FIG. 1-2, the elastic 14 contracts with the device 10 in the engaged position and provides a circumferential biased contact of the sidewall 19 portion of the body 16 of the cover device 10, against a circumferential exterior surface of a carrier sidewall 17 of such a conventional infant carrier 12.

The fabric forming the body 16, or at least the sidewall 19 thereof, as noted, is preferably elastic and will cause the body sidewall 19 to form to the contours of the sidewall 17 of the infant carrier 12 and form a contact against it and eliminate any gaps in the formed circumferential seal which is most important to keep out particulate.

In the mode of the device 10 of FIGS. 1-10, the biased engagement of the elastic 14, which is engaged to the body 16 and surrounds an opening 27 through which the carrier 12 engages into the body 16, serves to form a sealing point or circumferential seal of the body 16 of the cover device 10 against the carrier sidewall 17 of the carrier 12. It, thus, serves to insure air communicated into the interior cavity 18 follows a flow path to prevent unfiltered air from being communicated to the interior cavity 18 of the carrier 12 where an infant or small child would sit. In most instances where the filter device 10 is so engaged with a carrier 12, as it is adapted to do so, the body 16 of the cover device 10 will contact against the carrier sidewall 17 substantially along a contact line 13 and this contact forms a circumferential of the body 16 against the sidewall 17, which is maintained by the biased engagement of the sidewall 19 of the body 16 against the carrier, which is enabled by the elastic 14.

In a mode of the device 10 with shorter sidewalls 19, the contact line 13 will be at or adjacent an upper edge of the carrier sidewall 17 on the exterior side of the carrier 12, where the carrier sidewall 17 surrounds and defines the interior cavity 18. However, this may vary depending on the shape of the carrier 12. With the elastic 14 at or adjacent the perimeter edge of the body 16 and contracting to bias the sidewall 19 of the body 16 against the exterior surface of the carrier sidewall 17, the circumferential seal around the exterior of the carrier 12 is also formed along this contact line 13.

As shown, the cover device 10 is formed of a body 16 having a pocket 26 within the top wall 23 which is formed of a first sidewall 22 or sidewall portion which is opposite a second sidewall 24 or sidewall portion. The pocket 26 (FIG. 5) is, thus, formed between the two sidewall portions in all modes of the device. The pocket 26 is sized for insertion of a removably engageable filter element 20 of substantially the same size therein, through a pocket opening 28 providing access to the pocket 26.

Figure 11:
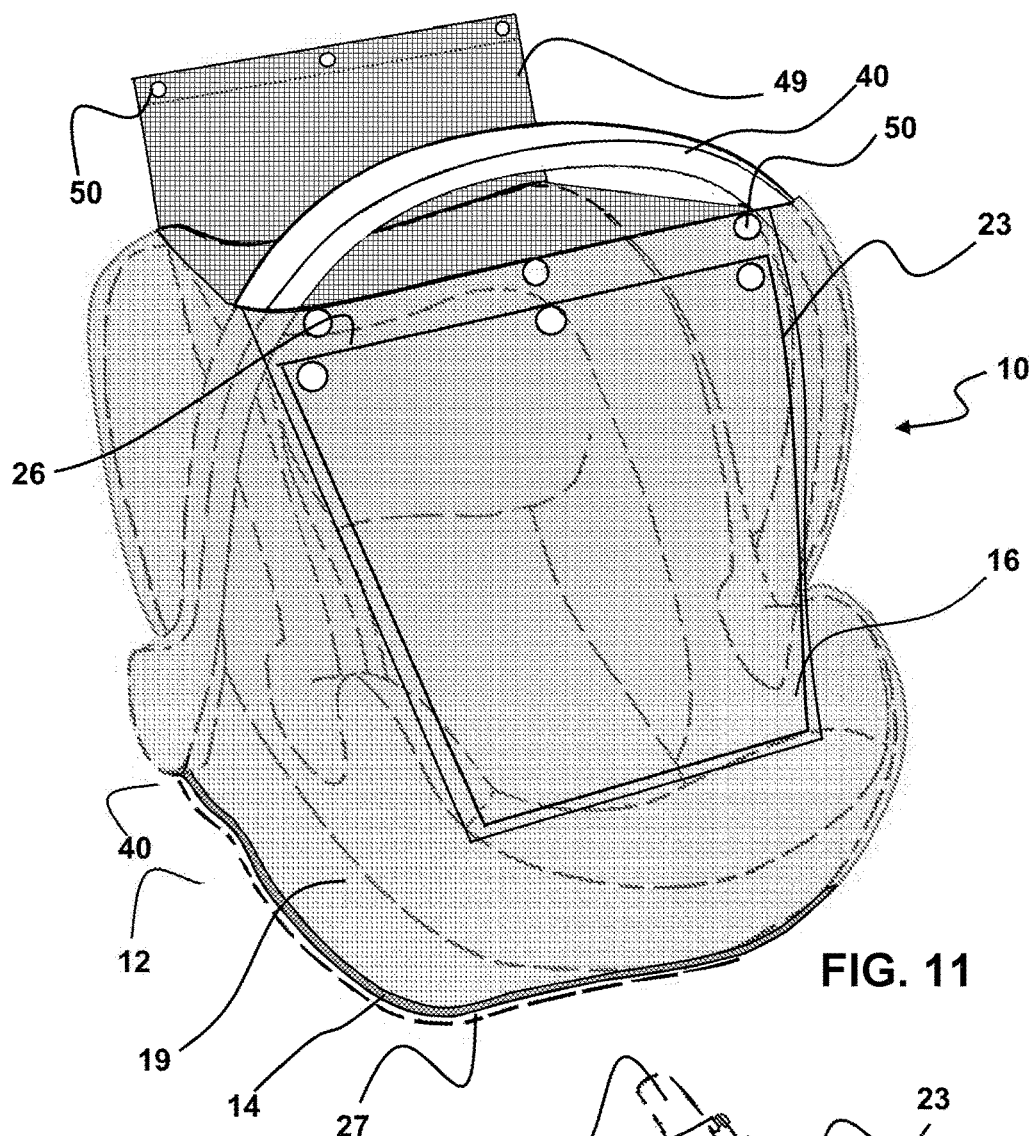
FIG. 11 shows another particularly preferred mode of the device herein having an extended body sidewall which extends along the carrier sidewall to the opening and which is positionable to a sealed circumferential side connection of the fabric upon a child carrier.

Elastic 14 is preferably engaged to the perimeter edge of the body 16 of the cover device 10 which surrounds the opening 27 through which the carrier 12 is passed, as it is positioned within the interior cavity 18, to put the body 16 in a mounted position, such as in FIG. 1 or FIG. 11. The elastic 14 may be sewn or glued or otherwise attached to the perimeter edge surrounding the opening 27, and in a default state, contracts to form a compressive engagement of the perimeter edge of the body 16, around and against the exterior surface of the sidewall 17 of the infant carrier 12 such as in FIGS. 1-2 and 6-7.

The first sidewall 22 and opposing second sidewall 24, on the opposite side of the formed pocket 26, are preferably formed of woven or non woven material having openings between the yarn or fibers forming the material. Shown herein is one preferred mesh material having mesh openings 30 therein which is porous and easily passes air therethrough. However, the material forming one or both of the first sidewall 22 and second sidewall 24 forming the sides of the pocket 26 may be woven fabric having mesh openings 30 between the yarn or threads in the weave or knit, with decorative patterns thereon and opaque in that it would block the view into and out of the interior cavity 18 and the carrier and provide shade.

The filter element 20, when inserted into the pocket 26, filters the air which is communicated to the interior cavity 18. Thus, with the body 16 of the device 10 in an engaged position upon the carrier 12, air follows a flow path which communicates through the mesh openings 30 in the first sidewall 22, then through said air passages in the filter element 20, and finally through the openings in the fabric forming the second sidewall 24, before that airflow reaches the interior cavity 18 and the carrier and any occupant therein. The air following this defined flowpath is, thus, filtered by both the mesh openings 30 and especially by the air passages 32 of the filter element 20, before reaching the occupant in the interior cavity 18.

The mesh fabric forming the first sidewall 22 and second sidewall 24, preferably, is knitted or woven or non woven fabric formed in a manner to maintain the spacing and size of the mesh openings 30 to maximize airflow therethrough. One preferred fabric with these characteristics is a polymeric coated mesh such as that sold by Phifer Incorporated, which is formed of vinyl coated fiberglass or polyester in an 18×14 or 18×16 weave. Such material, being vinyl coated, has been found to fix the size of the openings between threads forming it which maintains the openings 30 in their maximum size no matter the position or bend or fold of the material. This insures a maximum airflow through the openings 30 in the first sidewall 22, through the filter element 20, and then through the openings 30 in the second sidewall 24 to the occupant of the interior cavity 18 and the carrier 12 therein. Such a fabric, with fixed mesh openings 30, is preferred for the sidewalls forming the pocket 26.

However, as noted, in many cases, it is more desirable to employ a woven or non woven plain or decorative print fabric with mesh openings 30 between yarns. Such will provide shade and a blocked view into and out of the carrier 12. This configuration aids in shading the occupant and provides a calm space for napping. Such will work well as long as the openings between yarns or threads forming the woven or knitted fabric, will allow air passage therethrough.

Figure 4:
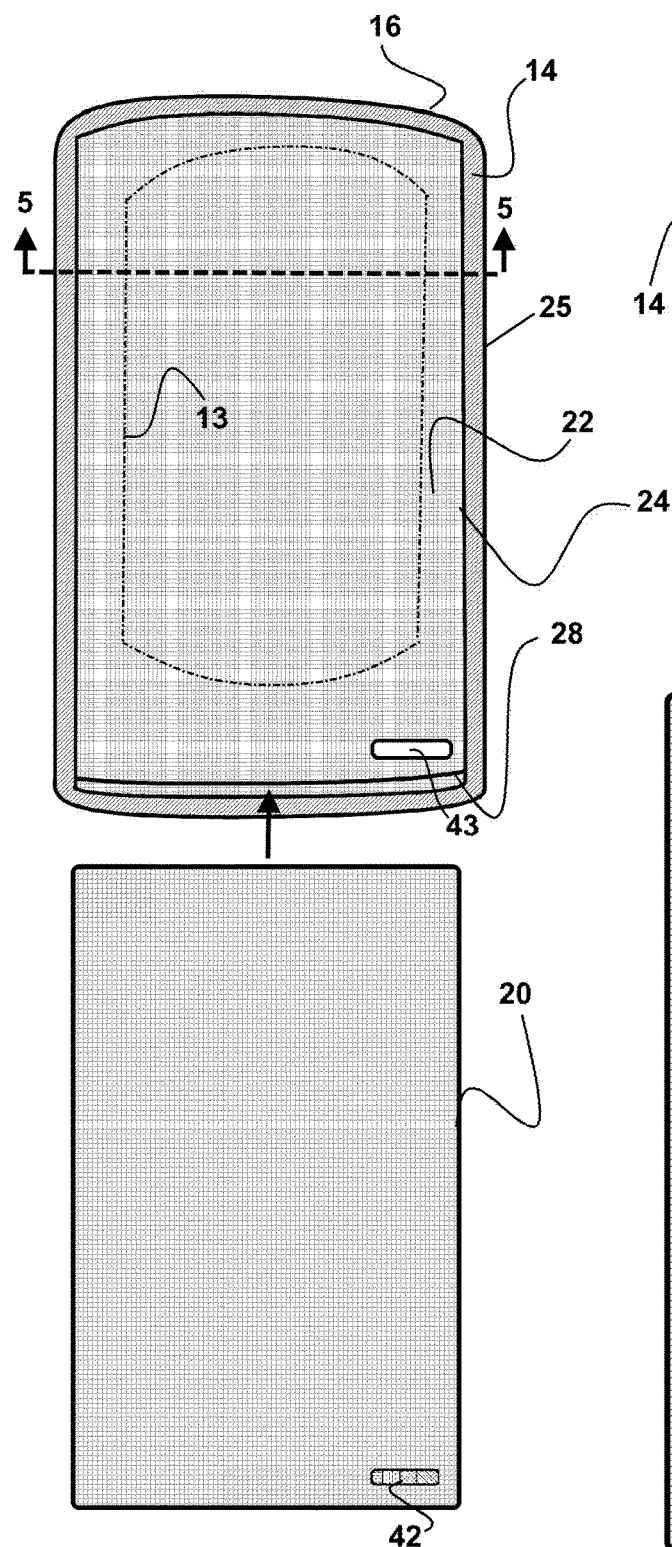
FIG. 4 shows the cover device, as in FIGS. 1-3, in an exploded view showing the filter element removed from engagement within a pocket in the body of the defining the cover device and showing a viewing aperture for the filter gauge when inserted.

Shown in FIG. 4 is the pocket 26 of the cover device 10 as in FIGS. 1-3 and 11-14 in an exploded view. As depicted, the filter element 20 is removed from engagement within a pocket 26 in the body 16 of the cover device 10. Also shown are the filter gauge strip 42 which is positioned to align with the pocket aperture 43 in the cover device 10 if employed. This pocket aperture 43 is positioned to register with and align with the filter gauge strip 42, and thereby allows the user to easily ascertain the current state of the filter element 20 while it is engaged within the pocket 26 without having to remove it to do so. The width and length of the planar filter element 20 are sized substantially equal to that of the pocket 26 so as to allow for a snug planar fit of the filter element 20 within the confines and perimeter defining the pocket 26.

While the pocket 26 is shown in FIG. 4 to cover substantially the entire upper area of the body 16 of the device 10, it may be formed smaller with a matching filter element 20. For example, the pocket 26 and engaged filter element 20 may be sized smaller than the top surface or panel of the body 16 within an area surrounded by the contact line 13 of the body 16 which contacts against the exterior of the carrier 12. This would be appropriate where the body 16 extends around the outside surface of the carrier sidewall 17 to the elastic 14, but first makes contact at a contact line 13 running around the exterior surface of the carrier sidewall 17. Since the seal, formed at the contact line 13, is closer to the interior cavity 18, occupied by an infant or child, a smaller pocket 26 engaged with a substantially equal sized filter element 20 may be employed which may reduce cost.

Further, it is anticipated that different fabric may be employed about a perimeter area of the body 16 which may prevent air passage therethrough, such as vinyl or sealed rip-stop material or the elastic material noted as used in the mode of the device of FIGS. 11-15. This fabric body sidewall 15 would, thus, surround and contact against the carrier sidewall 17 and form a circumferential seal around the sidewall 17 of the carrier 12. In this mode, the pocket 26 and filter element 20 can be formed in a smaller area formed of the woven or mesh fabric, such as or example within the contact line 13. The area of the body 16 outside the exemplar contact line 13 can be formed of material which will prevent air passage or of elastic material which will form a contoured circumferential seal around the carrier sidewall 17 and prevent air passage. This mode will also allow for a smaller pocket 26 and substantially equal sized filter element 20.

In one current preferred mode of the device 10, the filter element 20 is formed of woven or non woven polymeric material, such as polymeric expanded foam or elongated polymeric filter fibers placed, in fixed engagements to each other in a manner to maintain an opening size of air passages 32 communicating through the filter element 20. Currently, a preferred air passage 32 diameter of passages communicating through the filter element 20, is substantially 1.5 to 0.4 microns. This size range was found to work best in experimentation and is preferred in order to capture or render harmless the maximum amount of bugs, pollen, particulate, and pathogens in the air. Such is available in both expanded polymeric foam material filters and non woven polymeric fiber material filters and the like.

Additionally preferred is the employing filter material forming the expanded foam or fibers defining the filter element 20, which is impregnated with or includes one or a combination of anti-pathogenic materials from a group of anti-pathogenic materials including silver ions, nickel ions, and activated carbon. Such can be added to the polymeric mix of material employed for forming either a foam filter or a fiber material filter during manufacture. These anti-pathogenic materials act to kill germs and viruses and other pathogens which may be in the air which communicate through the passages 32 of the filter element 20, when the filter is operatively engaged within the pocket 26.

Figure 5:
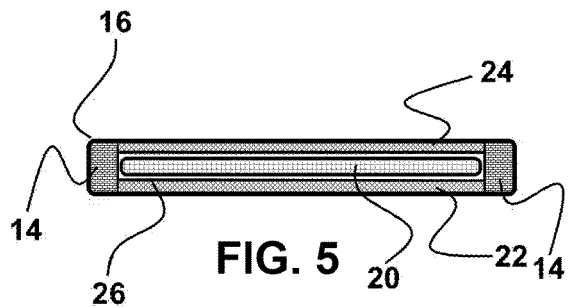
FIG. 5 shows a sectional view across lines 5-5 of FIG. 4 showing the air filter positioned within the pocket formed between a first sidewall and second sidewall forming the body of the cover device and showing elastic engaged on the perimeter.

FIG. 5 shows a sectional view across lines 5-5 of FIG. 4 showing the body 16 of the cover device 10 having the filter element 20 removably positioned within the pocket 26 formed between a first sidewall 22 and second sidewall 24 forming the top wall 23 of the body 16 of the cover device 10. By top wall 23 is meant the area of the body 16 in between the body sidewall 19 which contacts against the carrier sidewall 17 and which is positioned over an occupant of the carrier 12. Also depicted is the elastic 14 which, as noted, is preferably positioned around a perimeter of the opening 27 in the body 16 to provide the biased engagement around the circumference of the sidewall 17 of a carrier 12.

Figure 6:
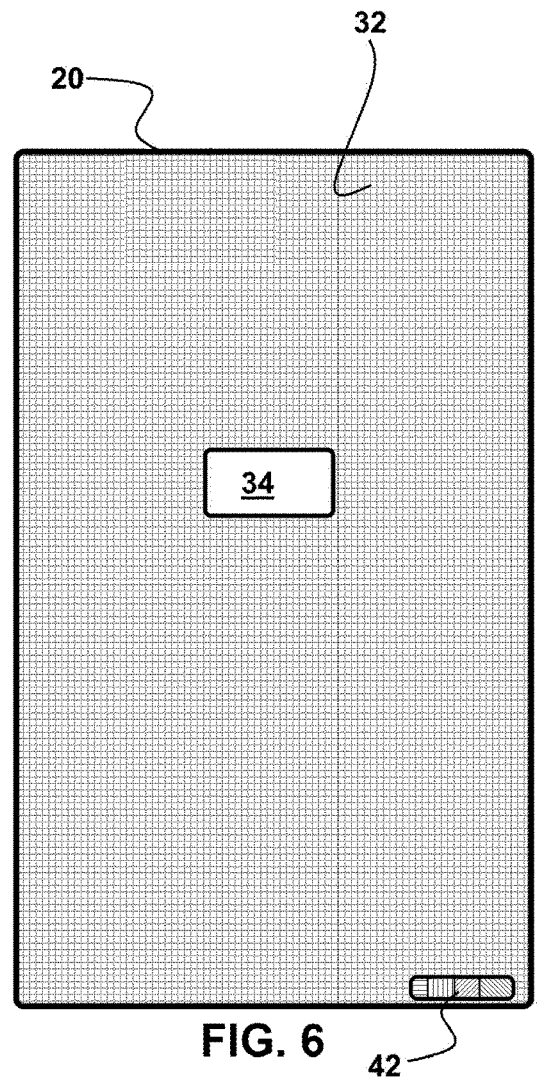
FIG. 6 is a view of the removably engageable filter showing an optional view opening which will align with sidewall openings for viewing and showing a gauge which changes appearance to indicate a time to replace the filter.

Depicted in FIG. 6 is another view of a removably engageable filter element 20. In this view is also shown an optional aperture 34. One or more apertures 34 may be formed to align with a viewing opening 36 (FIG. 6) formed in the sidewalls 22 and 24 defining the pocket in the top wall 23 of the body 16 and/or a handle opening 38 communicating through the body 16 which allows the grasping of the handle 40 of the carrier 12 during transport. Thus, one or more apertures 34 can be positioned in the filter element 20 which align with viewing openings 36 in both sidewalls of the body 16, and/or handle openings 38 communicating through both sidewalls 22 and 24 of the pocket 26 in the top wall 23 of the body 16.

Additionally shown in FIG. 6 is the visually discernable filter gauge strip 42 which reacts with the atmosphere over a calculated time period, and/or with pathogens, and changes color or appearance to signal that the filter element 20 should be replaced. The gauge strip 42 can for instance be impregnated with reagents which change appearance upon contact with the atmosphere over a determined duration, and/or, upon contact with the reagents with chosen pathogens determined particularly important.

Figure 7:
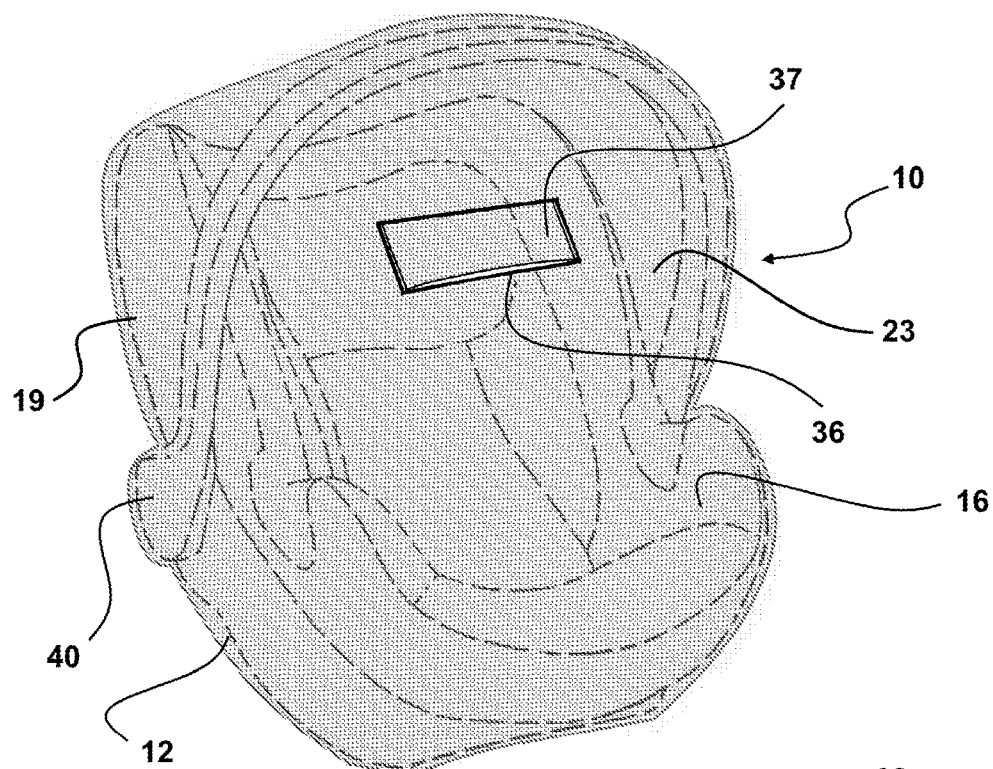
FIG. 7 depicts the device herein engaged on a carrier as in FIG. 1-2 having an optional view opening communicating through sidewall openings positioned under a raisable cover flap.

Depicted in FIG. 7 is the device 10 herein in the engaged position on a carrier 12 as in FIG. 1-2. In this mode of the device 10 the view opening 36 is provided which communicates through both sidewalls of the pocket in the body 16 and through an aligned aperture 34 in the filter element 20. The view opening 36 allows a user to look at the occupant of the interior cavity 18 and in carrier 12 as needed. Preferably a cover flap 37 is positioned to cover the view opening 36 when not in use to prevent air passage therethrough. The cover flap 37 may be a solid material so as to prevent air passage therethrough since the filter element 20 will not be present in the view opening 37.

Figure 8:
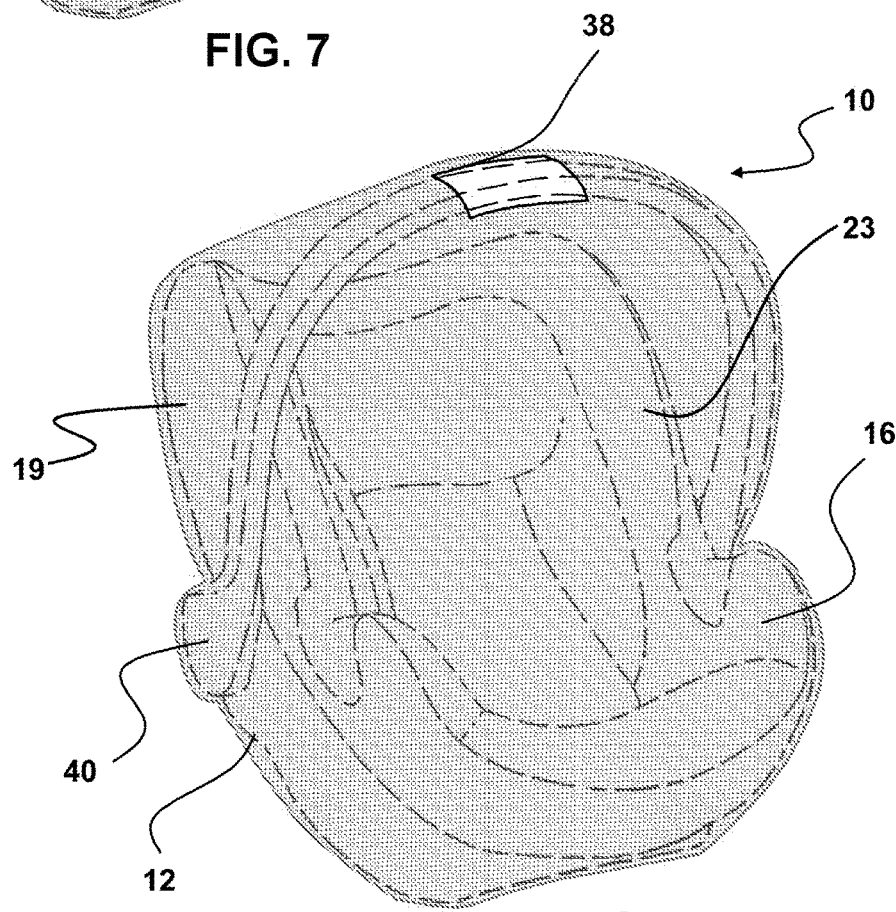
FIG. 8 shows the device, as in FIG. 7, showing an optional handle opening formed into the body of the cover device and filter providing an opening to grasp.

FIG. 8, shows a mode of the device 10, as in FIG. 7, showing an optional handle opening 38 communicating through the sidewalls 22 and 24 of the pocket and top wall 23 of the body 16. In this mode, an aperture 34 may also be formed into the filter element 20 which would align with the handle opening 38 once the filter element 20 is engaged in the pocket 26. A cover flap 37 (FIG. 7) is preferably positioned to cover this handle opening 38 when not in use. Of course, differing modes of the cover device 10 can have one or both of the viewing opening 36 and the handle opening 38, and the filter element 20 will be configured with one or more apertures 34 registered in positions to properly align with such.

Figure 9:
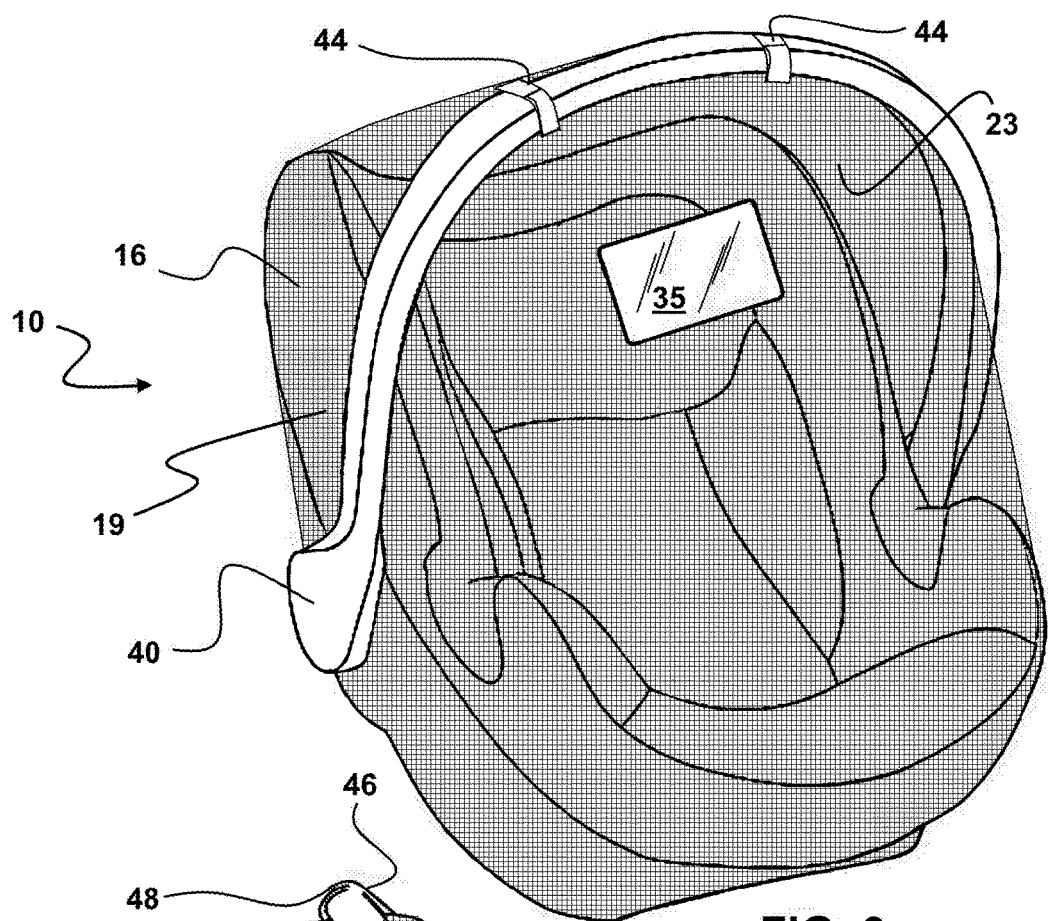
FIG. 9 depicts a particularly preferred mode of the device herein which includes at least one removably engageable connecting straps to connect the body to the handle of the carrier and support it above the occupant within the carrier.

A particularly preferred mode of the cover device 10 herein is shown in FIG. 9 and FIG. 11. In this mode of the device 10, an engagement to the handle 40 is provided that maintains the sealed interior cavity 18 but connects the top wall 23 to the handle 18 to hold it elevated when the body 16 is in an engaged position. As shown in FIG. 9, at least one handle connector 44, such as the depicted straps 46, are included. The connectors 44 are removably engageable to the handle 40 of the infant carrier 12 to provide support to the body 16 of the cover device 10 to hold it underneath the lower surface of the handle 40, while still maintaining it elevated above the interior cavity 18 and the carrier occupant. This mode is especially preferred in that it allows easy access and grasping of the handle for transport of the carrier 12 but maintains the body 16 of the cover device 10 operatively engaged to shade or provide an opaque or blocked view which is helpful if the infant is napping.

Currently the handle connector 44 in FIG. 9 is formed by straps 46 which are engaged to the body 16 and have cooperative fasteners thereon such as hook and loop fabric 48 or snaps or buttons. However, other removably engageable connectors, such as the cooperative connectors, such as snaps 50 of FIG. 11, which will temporarily engage the top wall 23 with the handle 40 and support the top wall 23 and pocket of the body 16 between the body sidewall 19 and elevated above the interior cavity 18 and occupant may be employed.

This engagement to the handle 40 also maintains the aperture 34 shown with a transparent flexible window 35 which allows viewing of the occupant when the fabric forming the body 16 is decorative or opaque. As noted, other connectors 44 such as C-clips, magnets, releasable adhesive, cooperative fasteners such as snaps 50, or such connectors 44 as would occur to those skilled in the art are anticipated within the scope of this patent.

Figure 10:
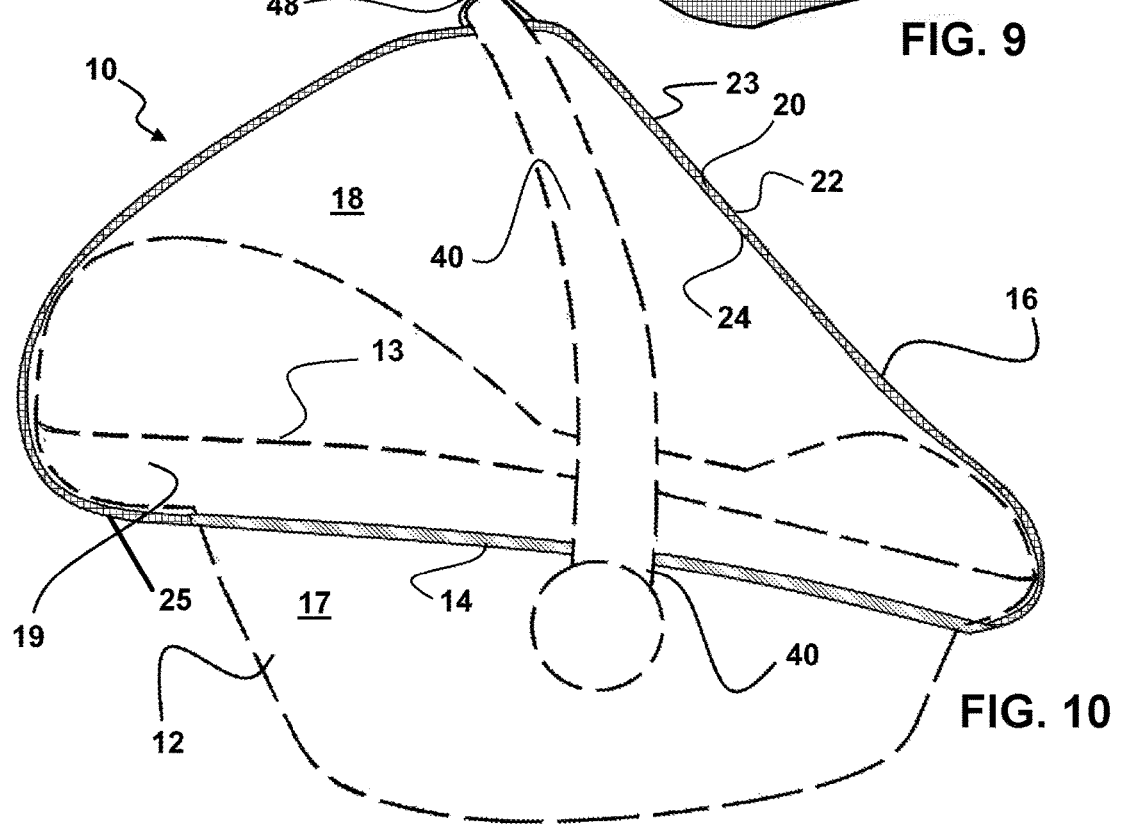
FIG. 10 shows a side sectional view of the body of the device herein configured as in all modes with opposing sidewalls and a filter element within the pocket and showing the connecting straps, such as in FIG. 9, maintaining the body elevated above the occupant while still exposing the handle for use.

In FIG. 10 is shown a side sectional view of the body 16 of the carrier device 10 herein configured, as in all modes noted above. As shown, the body 16 has the top wall 23 having the first sidewall 22 opposite a second sidewall 24 and a pocket 26 formed therebetween where a filter element 20 is located. This filter element 20 may be permanently located in the pocket 26, however as noted above, it is preferable if the filter element 20 is removable and replaceable with other filter elements 20 sized for positioning within the pocket 26 in between the porous sidewalls 22 and 24.

Shown in FIG. 11 is another particularly preferred mode of the device 10 herein, such as in FIG. 10, but where the body 16 has an extended body sidewall 19. The extended sidewall 19, in experimentation, was found to more easily form a seal for the area of the sidewall 19 which is adjacent to and thereby biasly contacts against the circumference of the sidewall 17. In addition to the larger area of formation of the circumferential seal, the longer sidewall 19 has shown to more easily operatively engage with a larger number of carriers 12 from different manufacturers. In this mode, the sidewall 19 of the body 16 extends to the opening 27 which is positioned adjacent to the bottom edge of the carrier 12 with the carrier in the engaged position. By adjacent is meant that the opening 27 which has a perimeter edge which is positioned at the bottom edge of the carrier or in a circumferential contact against the carrier sidewall 17 within six inches of the bottom edge.

Also in this mode of the device 10, the sidewall 19 of the body 16 is formed of woven or knitted or similar material which has yarn or threads which are elastic. This is especially preferred in that it significantly increases the area of the formed circumferential seal against the carrier sidewall 17 from the contact line 13, noted above, of about an inch in width, to a contact area of the sidewall 19 against the carrier sidewall 17 which is much wider in that substantially the entire area of the sidewall 19 which is adjacent to the carrier sidewall 17, contacts against the carrier sidewall 17. Additionally, the elastic fabric forming the sidewall 19, once the carrier 12 is in the interior cavity of the body 16, will form a circumferential biased contact of the sidewall 19 against the carrier sidewall 17, which is between 2-10 inches in width and which will also form to the biased engagement with the contours of the carrier sidewall 17 and any recesses or projections thereon, for a much better seal.

Also shown in FIG. 11 are cooperative fasteners 50 positioned upon a rear flap 49 which may be removably connected to mating cooperative fasteners 50 located on the top wall 23 of the body 16. Connecting the fasteners 50 on the rear flap 49 will hold it to a substantially sealed engagement to the top wall 23 and will operate the same as the connectors 44, to hold the top wall 23 elevated above the interior cavity and the occupant of the carrier. The handle 40 is still also easily grasped.

Figure 12:
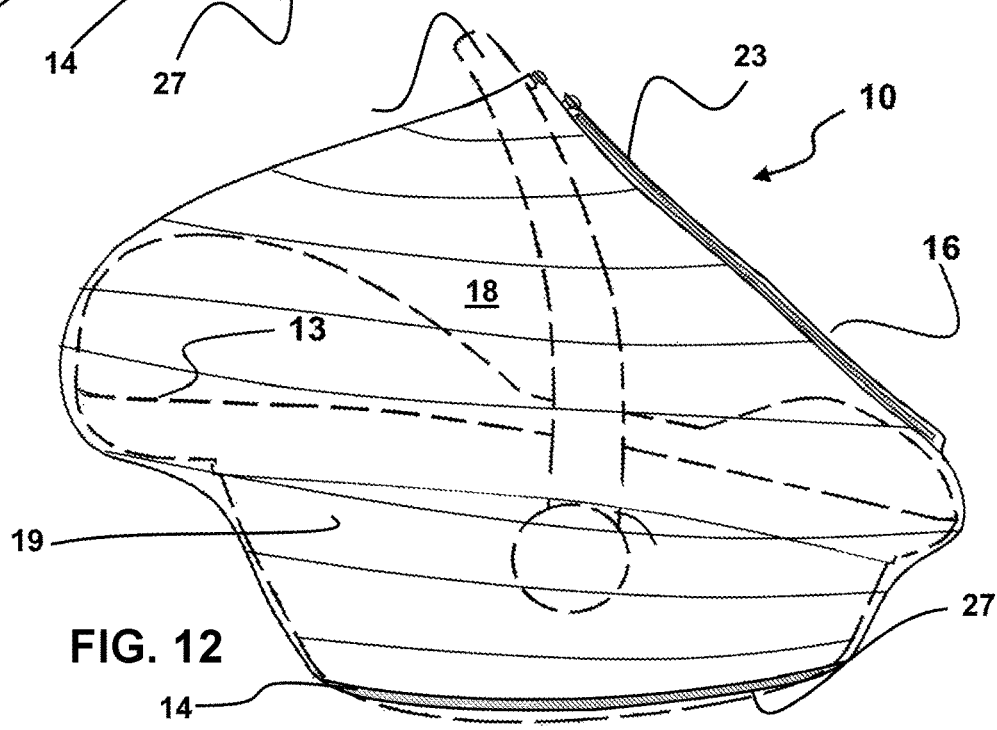
FIG. 12 shows the device, as in FIG. 11, showing the elastic surrounding the opening and the elastic material forming the sidewall of the body which will biasly contact against the carrier sidewall to form an enlarged seal therewith.

FIG. 12 shows the device, as in FIG. 11, showing the elastic 14 which surrounds the perimeter of the formed opening 27 which is positioned adjacent the bottom side of the carrier 12. Also shown are the extended sidewall 19 of the body 16 which as noted is formed of elastic material. In this mode, the area of the sidewall 19 of the body 16, which positioned adjacent the carrier sidewall 17, with the body 16 in the engaged position, will biasly contact against it to form a much better circumferential seal.

Figure 13:
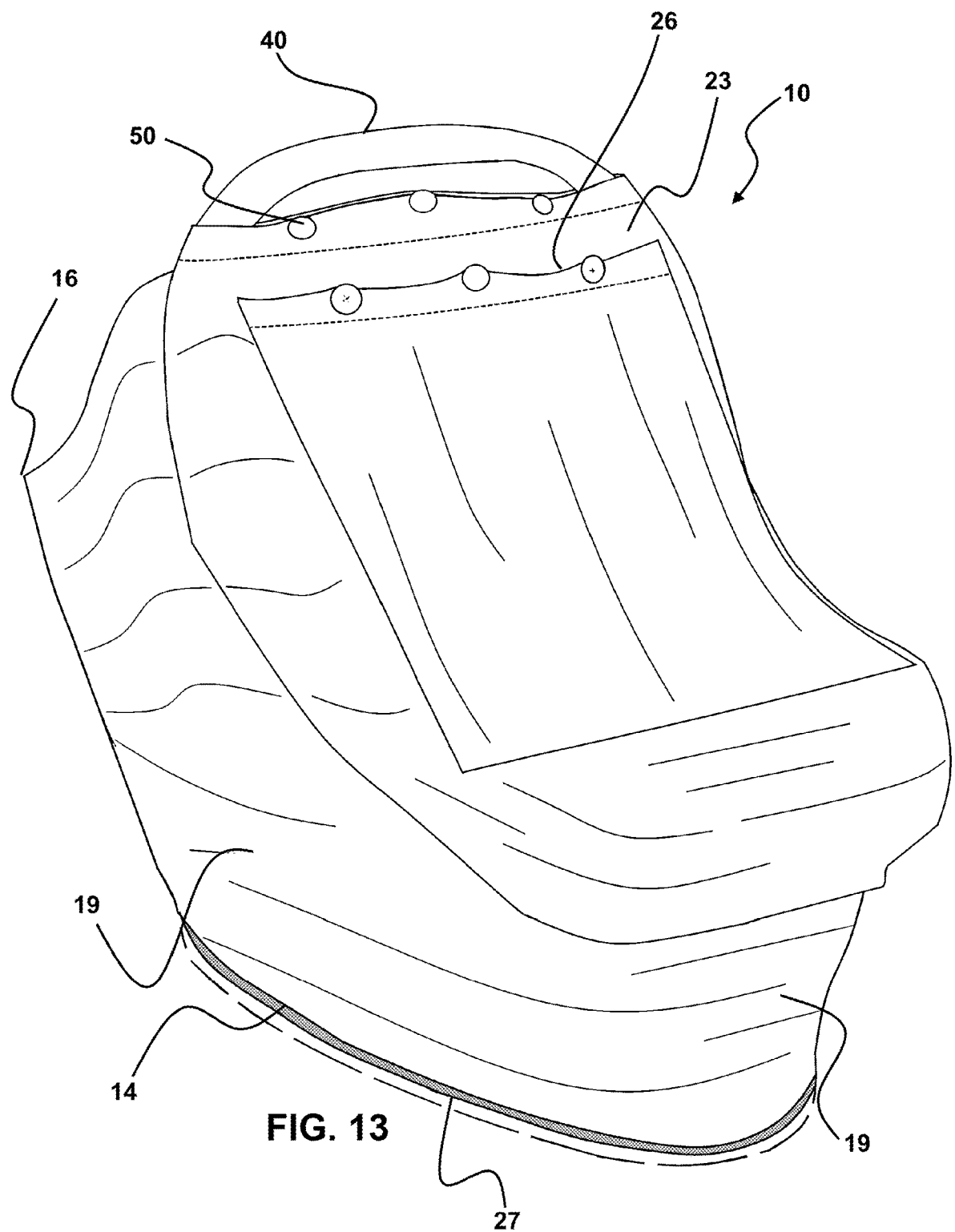
FIG. 13 depicts the device of FIGS. 11-12 in the engaged position wherein a child carrier is located within the interior cavity of the body, and a portion of the handle is still exposed for easy carrying.

FIG. 13 depicts the device 10 of FIGS. 11-12 in the engaged position upon a carrier showing the handle 40 extending from an area in between the rear flap 49 and the top wall 23, when the rear flap 49 is engaged to the top wall 23 by the engaged fasteners such as snaps 50. This forms a removable connection of the top wall 23 to the handle 40 in the same fashion as the connectors 44 and provides the preferred holding of the top wall 23 elevated.

Figure 14:
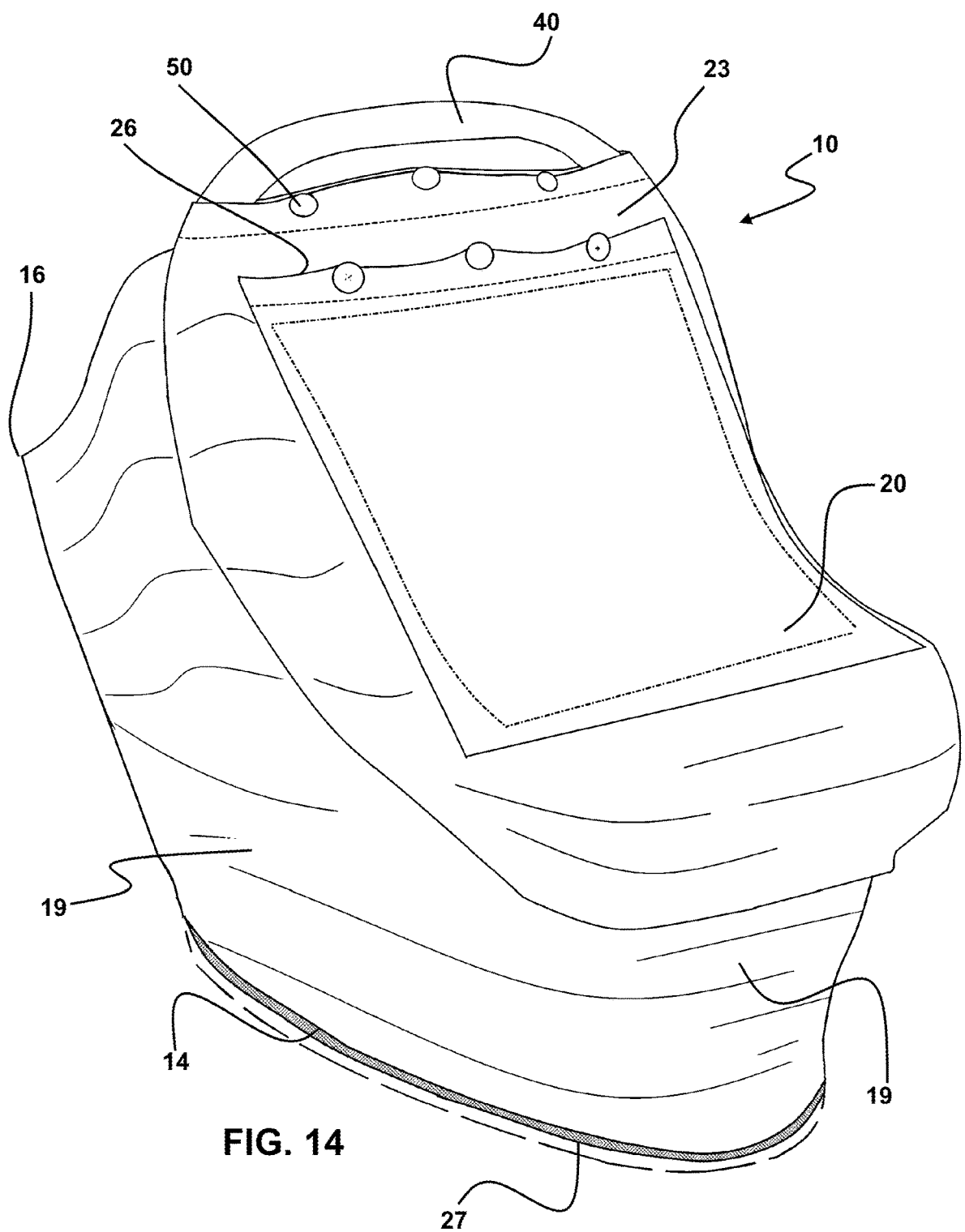
FIG. 14 shows the device, as in FIGS. 11-13, and shows the filter positioned within the pocket formed in the top wall of the body.

In FIG. 14 is depicted the device 10 as in FIGS. 11-13 and showing the filter 20 positioned within the pocket 26 formed in the top wall 23 of the body 16. The pocket 16 is formed in the same fashion, as noted above, with a first sidewall 22 and second sidewall 24 on opposing sides of the pocket 26. One of the first sidewall 22 or second sidewall 24 can be formed by the fabric forming the tope wall 23, or it can be formed into the top wall 23 as a portion thereof. The material with fixed sized air passages 32 noted above can be employed for these sidewalls.

Figure 15:
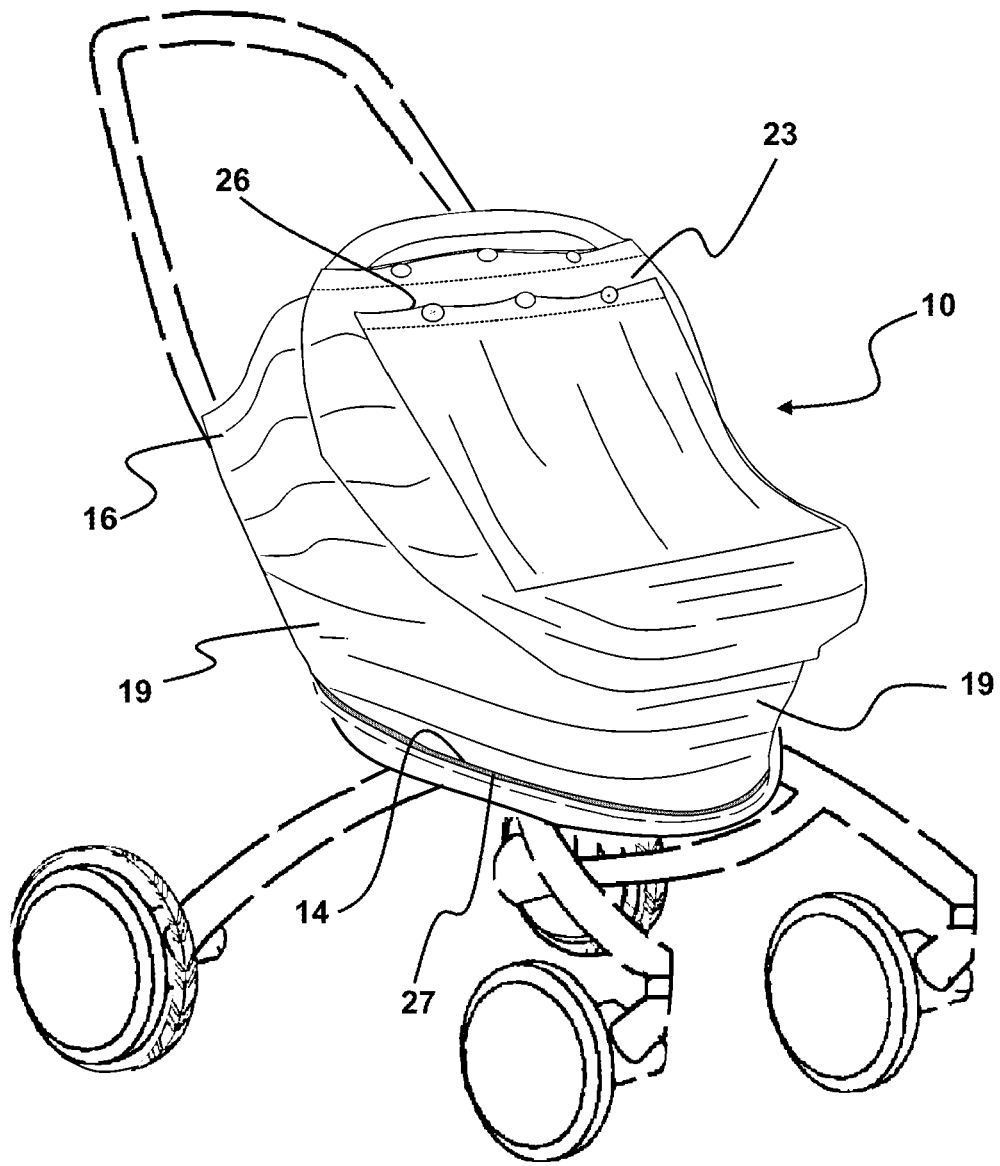
FIG. 15 shows the device engaged upon a stroller-positioned child carrier.

Finally, as shown in FIG. 15, the device 10 herein, can be configured to be engaged upon a stroller-positioned child carrier. The extended sidewall 19 formed of elastic fabric has been shown to work especially well in this configuration as it provides the biased contact of the sidewall 19 of the body 16 of the device 10 in the area of the sidewall 19 which is positioned adjacent the carrier sidewall 17 with the body 16 in the mounted position upon a carrier.

It should be noted than any of the different depicted and described configurations and components of the infant carrier engageable filter device herein can be employed with any other configuration or component shown and described as part of the device herein. Additionally, while the present invention has been described herein with reference to particular embodiments thereof and steps in the method of production, a latitude of modifications, various changes and substitutions are intended in the foregoing disclosures, it will be appreciated that in some instance some features, or configurations, of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. An air filtering cover for an infant carrier, comprising:
    a cover body, said cover body configured to form an engagement around an exterior surface of a carrier sidewall of an infant carrier, to an engaged position with said infant carrier located in an interior cavity of said cover body;
    a body sidewall of said cover body forming a circumferential contact around said carrier sidewall of said infant carrier with said infant carrier in said engaged position;
    said cover body having a top wall extending between opposing sections of said body sidewall at a front end of said cover body;
    a rear flap, said rear flap extending from a first end thereof at a rear portion of said body sidewall, to a distal edge;
    a handle opening positioned between said rear flap and a top edge of said top wall, said handle opening configured with a width for a positioning of a gripping end of a handle extending from said infant carrier therethrough;
    a plurality of connectors positioned along said top edge of said top wall;
    a plurality of mating connectors positioned along said distal edge of said rear flap;
    said connectors on said top edge removably engageable to said mating connectors on said rear flap to form an engagement of said top edge against said distal edge of said rear flap;
    said engagement including a handle contact of said rear flap and said top edge against opposing sides of said gripping end of said handle;
    said handle contact holding said top wall elevated above the interior cavity and any occupant of said interior cavity;
    a pocket located upon said top wall, said pocket located between a first sidewall formed of fabric having first openings communicating therethrough and a second sidewall having second openings communicating therethrough;
    a filter element positioned in said pocket, said filter element having air passages communicating therethrough; and
    a flowpath for air communicated to said infant carrier with said cover body in said engaged position; and
    said flowpath communicating through said first openings, to and through said air passages and then to and through said second openings, whereby said air following said flowpath is filtered by said air passages.

2. The air filtering cover for an infant carrier of claim 1, additionally comprising:
    an opening for passage of said infant carrier into said interior cavity;
    elastic engaged to said cover body along or adjacent a perimeter edge of said opening; and
    said elastic so forming a biased engagement of said sidewall of said cover body against an exterior surface of said carrier sidewall.

3. The air filtering cover for an infant carrier of claim 1, additionally comprising:
    said body sidewall formed of elastic material, and
    an area of said body sidewall positioned adjacent said carrier sidewall forming said circumferential contact around said carrier sidewall to a biased contact of said area of said body sidewall with said carrier sidewall, wherein said area of said body sidewall forms to contours of said carrier sidewall.

4. The air filtering cover for an infant carrier of claim 1, additionally comprising:
    a pocket opening communicating with said pocket; and
    said filter element being removably positionable within said pocket whereby it can be replaced.

5. The air filtering cover for an infant carrier of claim 2, additionally comprising:
    a pocket opening communicating with said pocket; and
    said filter element being removably positionable within said pocket whereby it can be replaced.

6. The air filtering cover for an infant carrier of claim 3, additionally comprising:
    a pocket opening communicating with said pocket; and
    said filter element being removably positionable within said pocket whereby it can be replaced.

7. The air filtering cover for an infant carrier of claim 1, additionally comprising:
    said air passages communicating through said filter element have a diameter substantially between 1.5 to 0.4 microns.

8. The air filtering cover for an infant carrier of claim 2, additionally comprising:
    said air passages communicating through said filter element have a diameter substantially between 1.5 to 0.4 microns.

9. The air filtering cover for an infant carrier of claim 3, additionally comprising:
    said air passages communicating through said filter element have a diameter substantially between 1.5 to 0.4 microns.

10. The air filtering cover for an infant carrier of claim 4, additionally comprising:
    said air passages communicating through said filter element have a diameter substantially between 1.5 to 0.4 microns.

11. The air filtering cover for an infant carrier of claim 1, additionally comprising:
    a gauge strip engaged to said filter element;
    said gauge strip impregnated with reagents which change in appearance upon contact of said gauge strip with the atmosphere over a determined duration, and/or upon contact of said gauge strip with pathogens actuating a said reagent; and
    whereby said change in appearance defines a visual signal to change said filter element.

12. The air filtering cover for an infant carrier of claim 2, additionally comprising:
  a gauge strip engaged to said filter element;
  said gauge strip impregnated with reagents which change in appearance upon contact of said gauge strip with the atmosphere over a determined duration, and/or upon contact of said gauge strip with pathogens actuating a said reagent; and
  whereby said change in appearance defines a visual signal to change said filter element.

13. The air filtering cover for an infant carrier of claim 3, additionally comprising:
  a gauge strip engaged to said filter element;
  said gauge strip impregnated with reagents which change in appearance upon contact of said gauge strip with the atmosphere over a determined duration, and/or upon contact of said gauge strip with pathogens actuating a said reagent; and
  whereby said change in appearance defines a visual signal to change said filter element.

14. The air filtering cover for an infant carrier of claim 4, additionally comprising:
  a gauge strip engaged to said filter element;
  said gauge strip impregnated with reagents which change in appearance upon contact of said gauge strip with the atmosphere over a determined duration, and/or upon contact of said gauge strip with pathogens actuating a said reagent; and
  whereby said change in appearance defines a visual signal to change said filter element.

15. An air filtering cover for an infant carrier, comprising:
  a cover body, said cover body configured to form an engagement around an exterior surface of a carrier sidewall of an infant carrier, to an engaged position with said infant carrier located in an interior cavity of said cover body;
  a body sidewall of said cover body forming a circumferential contact around said carrier sidewall of said infant carrier with said infant carrier in said engaged position;
  said cover body having a top wall extending between opposing sections of said body sidewall at a front end of said cover body;
  a rear flap, said rear flap extending from a first end thereof at a rear portion of said body sidewall, to a distal edge;
  a handle opening positioned between said rear flap and a top edge of said top wall, said handle opening configured with a width for a positioning of a gripping end of a handle extending from said infant carrier therethrough;
  a plurality of connectors positioned along said top edge of said top wall;
  a plurality of mating connectors positioned along said distal edge of said rear flap;
  said connectors on said top edge removably engageable to said mating connectors on said distal edge of said rear flap to form a contact of said distal edge of said rear flap against said distal top edge;
  said contact including a handle contact of said distal edge of said rear flap and said top edge, against opposing sides of said gripping end of said handle;
  said handle contact holding said top wall elevated above the interior cavity and any occupant of said interior cavity; and
  said top wall formed of fabric having first openings communicating therethrough, whereby airflow to said interior cavity is filtered through said first openings.

16. The air filtering cover for an infant carrier of claim 15 additionally comprising:
  a pocket located upon said top wall, said pocket located between a first sidewall formed of the fabric having said first openings communicating therethrough and a second sidewall having second openings communicating therethrough;
  a filter element positioned in said pocket, said filter element having air passages communicating therethrough; and
  a flowpath for said airflow, the airflow being communicated to said infant carrier with said cover body in said engaged position; and
  said flowpath communicating through said first openings, to and through said air passages and then to and through said second openings, whereby said airflow following said flowpath is filtered by said air passages.

* * * * *